United States Patent
Canzian et al.

(10) Patent No.: US 9,137,937 B2
(45) Date of Patent: Sep. 22, 2015

(54) MODIFIED SURFACE TOPOGRAPHY FOR AN AGRICULTURAL TOOL

(71) Applicants: INSTITUTO NACIONAL DE TECNOLOGIA AGROPECUARIA, Ciudad de Buenos Aires (AR); UNIVERSIDAD TECNOLOGICA NACIONAL, Ciudad de Buenos Aires (AR)

(72) Inventors: Adrian Marcelo Canzian, Buenos Aires (AR); Jose Crisanti, Buenos Aires (AR); Carlos Alberto Monti, Buenos Aires (AR); Eduardo Alfredo Favret, Buenos Aires (AR); Hector Jose Maria Morras, Buenos Aires (AR); Angel Romito, Buenos Aires (AR); Marcos Andres Roba, Buenos Aires (AR); Juan Pablo D'Amico, Buenos Aires (AR); Mario Omar Tesouro, Buenos Aires (AR)

(73) Assignee: INSTITUTO NACIONAL DE TECNOLOGIA AGROPECUARIA, Buenos Aires (AR)

( * ) Notice: Subject to any disclaimer, the term of this patent is extended or adjusted under 35 U.S.C. 154(b) by 49 days.

(21) Appl. No.: 14/055,489

(22) Filed: Oct. 16, 2013

(65) Prior Publication Data

US 2014/0102738 A1  Apr. 17, 2014

Related U.S. Application Data

(60) Provisional application No. 61/714,441, filed on Oct. 16, 2012.

(51) Int. Cl.
| | |
|---|---|
| A01B 35/32 | (2006.01) |
| A01B 76/00 | (2006.01) |
| A01B 1/02 | (2006.01) |
| A01B 15/02 | (2006.01) |
| A01B 15/16 | (2006.01) |
| A01C 5/06 | (2006.01) |
| A01B 35/20 | (2006.01) |

(52) U.S. Cl.
CPC . *A01B 1/02* (2013.01); *A01B 15/02* (2013.01); *A01B 15/025* (2013.01); *A01B 15/16* (2013.01); *A01C 5/06* (2013.01); *A01B 35/20* (2013.01)

(58) Field of Classification Search
USPC .......................................... 172/604
IPC ..................... A01B 35/20,59/002, 76/00, 35/32
See application file for complete search history.

(56) References Cited

U.S. PATENT DOCUMENTS

| | | | | |
|---|---|---|---|---|
| 4,315,375 | A * | 2/1982 | Shinn | 37/460 |
| 5,172,770 | A | 12/1992 | Moyle | |
| 5,601,325 | A * | 2/1997 | Sokaski | 294/49 |

(Continued)

FOREIGN PATENT DOCUMENTS

EP  2 407 671 A1  1/2012

*Primary Examiner* — Gary Hartmann
(74) *Attorney, Agent, or Firm* — Muncy, Geissler, Olds & Lowe, P.C.

(57) ABSTRACT

A modified surface topography for agricultural tools includes dimples are arranged in a parallelogram (hexagonal) pattern, the morphological unit of which is an equilateral triangle. This surface pattern can be applied to various tools which are impeded by the traction of the soil.

8 Claims, 4 Drawing Sheets

(56) References Cited

U.S. PATENT DOCUMENTS

| | | | |
|---|---|---|---|
| 5,802,947 A * | 9/1998 | Ward et al. ............ 83/835 |
| D426,560 S * | 6/2000 | Texler et al. ............ D15/139 |
| 6,145,426 A * | 11/2000 | Ward et al. ............ 83/835 |
| 6,532,855 B1 | 3/2003 | Ward et al. |
| 6,739,991 B1 | 5/2004 | Wardropper |
| 2003/0024354 A1 * | 2/2003 | Ward et al. ............ 76/58 |
| 2009/0101370 A1 | 4/2009 | Tasovski |
| 2011/0318189 A1 | 12/2011 | Teraoka et al. |

\* cited by examiner

MODIFIED SURFACE TOPOGRAPHY FOR AN AGRICULTURAL TOOL

FIELD OF THE INVENTION

The present invention relates to improvements in the surface topography of agricultural tools that interact with the soil.

BACKGROUND OF THE INVENTION

During the mechanical action that involves the soil removal or soil disruption, the adhesion thereof to the agricultural tools play a major role, affecting both work quality and efficiency of the process. Certain fundamental tasks such as planting or seeding are preferably made with high water content in the soil as it is favorable for rapid germination and crop emergence. However, under these conditions, adhesion of soil to the distribution train parts of the seeder, such as blades (Coulters), tillers, furrow openers and seed furrow closers may affect the correct placement of the seed into the furrow reducing the efficiency of implantation. The labor should often be stopped due to clogging of the planter, drill, or seeders even though the soil conditions allow the transit of equipment.

The reduction of soil adhesion to working parts or tools would allow, firstly, to achieve opening and closing of furrows that render a suitable distribution and germination of seeds and secondly, to get an earlier labor start by increasing the time available to perform the tasks. Having more time means increasing the opportunity to work, which would allow reducing the power required to perform the same amount of work and reduce both operating costs and application of surface loads leading to the densification of the soil.

The foregoing also applies to equipment for addition of fertilizers or pesticides into the soil, by means of disk harrows prior to crop seeding or by means of row crop cultivators after crop emergence.

Special consideration must be given to plowing or tillage or subsoiling carried out by scarifiers, chisels or subsoilers. These labors generate a deep soil disturbance and for this reason are the ones which demand the highest levels of power. In this case, the adhesion of soil to working tools makes the interaction between them be produced in a soil-soil interface. Reducing said adhesion means replacing the soil-soil friction with friction between metal and soil, which can reduce the energy requirement of the labors.

For all, the above, if the adhesion is reduced not only can it be reduced the traction or drawing force on the tool with a consequent reduction in fuel consumption, but also the time window for carrying out plowing or tillage can be extended by reducing the required power.

In recent decades, biomimetics, i.e. the designing, building, testing and maintaining artificial systems which are inspired by living systems, has opened a fruitful field of investigation for applications and engineering solutions. These innovations inspired by nature originally derived from the work of Leonardo da Vinci on the study of bird flight. Given the characteristics of the subject matter, however, the first patent inspired by biomimetics was filed not earlier than the mid-1950s, corresponding to the final design of Velcro, in 1955, by George de Mestral, a Swiss engineer. Today the analysis of functional and structural principles of certain biological surfaces allows their use in artificial systems made by man. Examples include the effect of shark, skin to generate anti-friction surfaces (surface of the fuselage of the Airbus 380), the moth-eye effect to achieve anti reflection surfaces (solar cells), the Gecko effect for the development of dry adhesion surfaces (smart adhesives) and the lotus effect (Lotus plant, *Nelumbo nucifera*) to produce self-cleaning ultra-hydrophobic surfaces (Lotusan paints).

Patent application US 2009/0101370 A1 (Tasovski) discloses a bulldozer blade with a soil interaction surface with an array of anti-adhesion biomimetic protrusions that project out of the base surface. The protrusions are arranged in a rectangular pattern.

European patent application EP 2407671 A1 (Tei et al.) discloses a fan blade with an array of dimples in the vicinity of the edge in order to change a boundary layer from laminar flow to turbulent flow. It deals only with aerodynamic issues.

U.S. Pat. No. 5,172,770 (Moyle) discloses an agricultural share with depressions in the vicinity of the edge in order to reduce the "footprint" area of the share. No mention is made to a critical or advantageous specific depression array.

U.S. Pat. No. 6,532,855 B1 (Ward et al.) discloses a saw blade having a multiplicity of discrete dimples of different shape and randomly arranged. No mention is made to a critical or advantageous specific depression array.

U.S. Pat. No. 6,739,991 B1 (Wardropper) discloses apparatus and method for making a ceramic arrowhead blade having improved features regarding strength, weight and corrosion resistance, the blade may have dimples on its surface. The dimples are arranged in a rectangular pattern and no mention is made to a critical or advantageous specific depression array.

SUMMARY OF THE INVENTION

To overcome the adhesion of soil to solid surfaces of the components of agricultural machinery, the present invention applies biomimetic principles and characteristics of soil fauna for designing such surfaces. The phenomenon of adherence increases the required drawing force as well as energy consumption of machinery, decreasing the quality of work. The animals that inhabit the soil do not have this problem and move without the soil sticking to them, because of their geometric shapes, hydrophohicity, micro-electro-osmotic systems, lubrication and flexibility of the cuticular surface. The physicochemical, mechanical and geometric features of those species can be used for the design of materials and structures of agricultural tools.

The present invention addresses this problem by modifying the surface topography of the bodies involved in the agricultural tools. This has a deep ecological and economic impact resulting from saving fuel and labor time. The macro and micro surface topography design of the tool of the present invention is effective to decrease the adherence of soil to the surface of the agricultural tools with a noticeable and significant reduction in the traction force and an increased capacity of penetration of the tool, due to replacement of soil-soil friction with soil-metal friction.

Therefore, it is an object of the present invention an agricultural tool with a modified surface topography in order to reduce the adherence of the soil to the tool. The topography is comprised of morphological elements.

The inventors have found that agricultural tools can be substantially improved, particularly regarding the traction force demand when interacting with the soil, when the tool surface is provided with dimples arranged in a parallelogram (hexagonal) pattern the morphological unit of which is an equilateral triangle.

In a more preferred embodiment the elements or units are conical/hemispherical dimples with a corrected planar density ($PD_C$), as defined below in the present application, in the range of 0.0161-0.0945, corresponding to a relationship between the dimples radius (r) and the distance (d), r/d in the range of 0.067-0.161.

In most preferred embodiments of the present invention, the $PD_C$ is 0.0299 or 0.05.

The dimple depth (h) depends on the tool thickness and its diameter (2r) depends on the tool size.

In most preferred embodiments of the present invention, the dimple depth is of about 1 mm and its diameter is of about 2 mm.

In preferred embodiments of the present invention, the dimples are conical or hemispherical, but they can have other different morphologies, e.g. cylindrical or pyramidal. A single morphology or a combination of more than one can be applied on the tool surface.

In another preferred embodiment of the present invention, the tool surface has been treated in order to delay or avoid the elements or units to be worn out.

In another embodiment of the present invention, the morphological units are arranged in rows that are spaced apart at specific angles from each other.

In yet another preferred embodiment of the present invention, the morphological units are arranged in small groups that form rows that are parallel or are spaced apart at specific angles from each other, more preferable in the range of 5°-15° and most preferably having a radial distribution.

The morphological elements or units of the present invention can be prepared by machining, controlled material deposition, grinding, chemical processes, laser metallurgy or plasma coating, applied on the tool surface.

The agricultural tool of the present invention may be a blade (coulter), a shovel, a tiller, a furrow opener or seed furrow closer, a scarifier, a chisel or a subsoiler.

BRIEF DESCRIPTION OF THE DRAWINGS

The invention will be better understood with reference to the following description of a specific embodiment thereof as shown in the accompanying drawings in which.

DETAILED DESCRIPTION OF THE INVENTION

Figure 1:
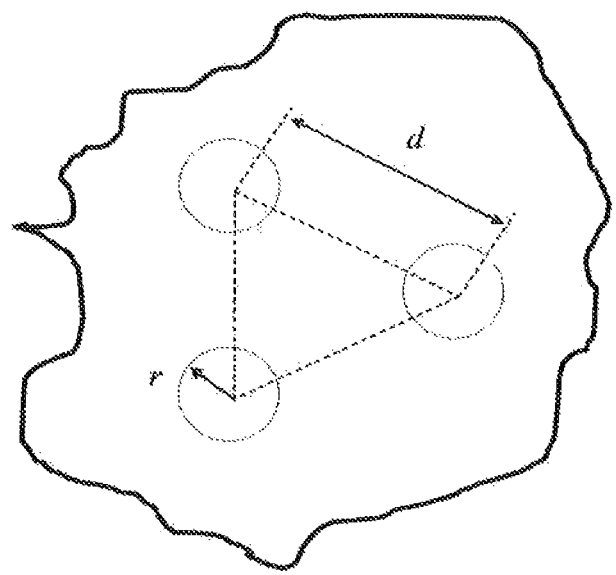
FIG. 1 is a detailed view of the morphological topography of the tool surface showing the dimple distribution according to an embodiment of the present invention.

The invention will be described in detail by making reference to the drawings as follows:

FIG. 1 shows a preferred embodiment of morphological unit of the tool surface arrangement of dimples, which unit is an equilateral triangle.

Figure 2:
FIG. 2 is a detailed cross-sectional view of a hemispherical dimple on the tool surface, according to an embodiment of the present invention.

FIG. 2 is a detailed cross-sectional view of a hemispherical dimple on the tool surface, according to an embodiment of the present invention.

Figure 3:
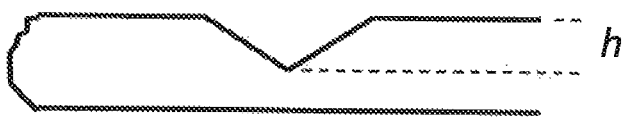
FIG. 3 is a detailed cross-sectional view of a conical dimple on the tool surface, according to another embodiment of the present invention.

FIG. 3 is a detailed cross-sectional view of a conical dimple on the tool surface, according to another embodiment of the present invention.

Figure 4:
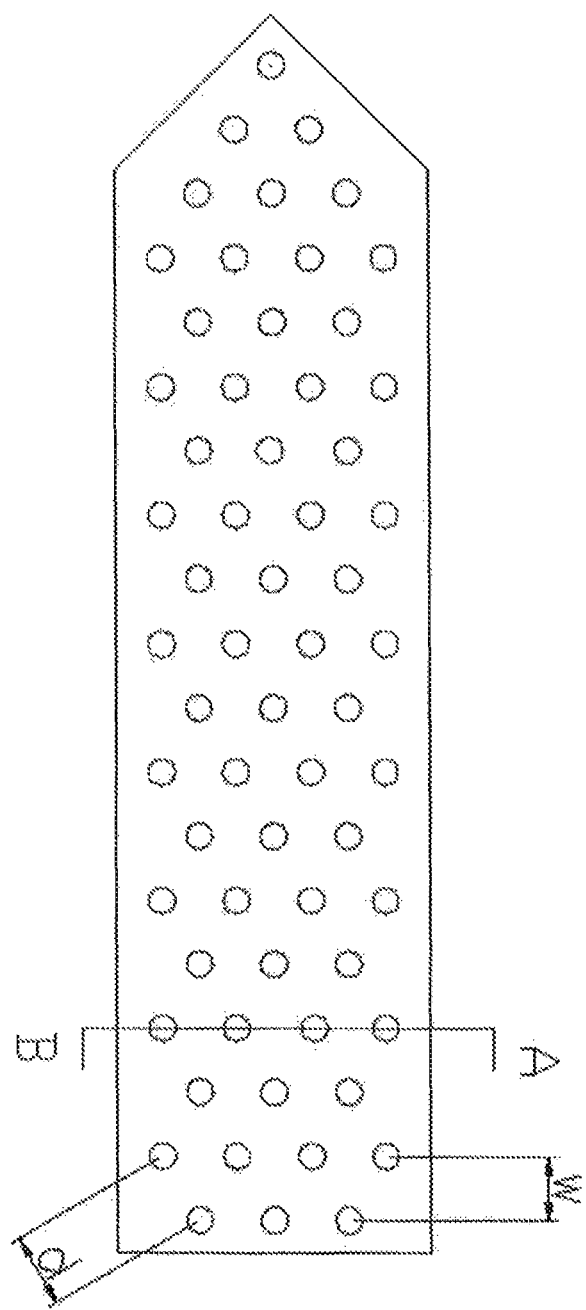
FIG. 4 is a top view of a shovel according to the present invention.

FIG. 4 shows a shovel of the invention with a surface morphology comprising a plurality of hemispherical dimples arranged in a parallelogram (hexagonal) pattern the morphological unit of which is an equilateral triangle. In this embodiment, the dimples have a 0.5 mm-depth (h) and 2 mm-diameter (2r), and are 10 mm sidewise (d) apart and 8.7 mm longwise (w) apart.

Figure 5:
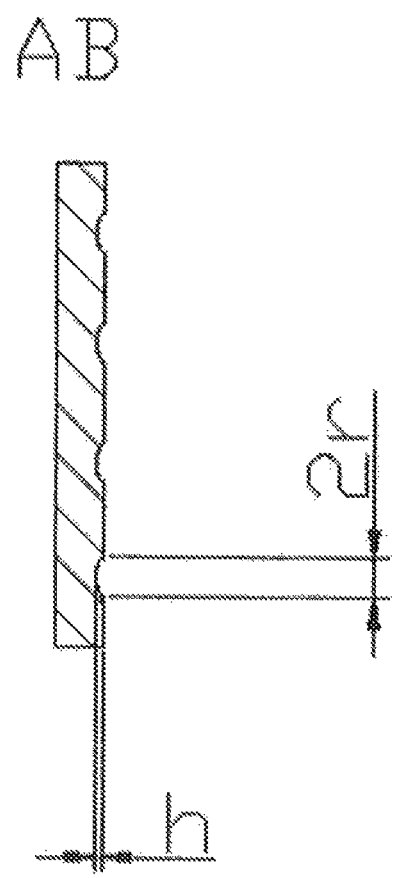
FIG. 5 is a cross-sectional view of the shovel of FIG. 4 along the line A-B.

FIG. 5 is a cross-sectional view of the shovel of FIG. 4 along the line A-B.

Figure 6:
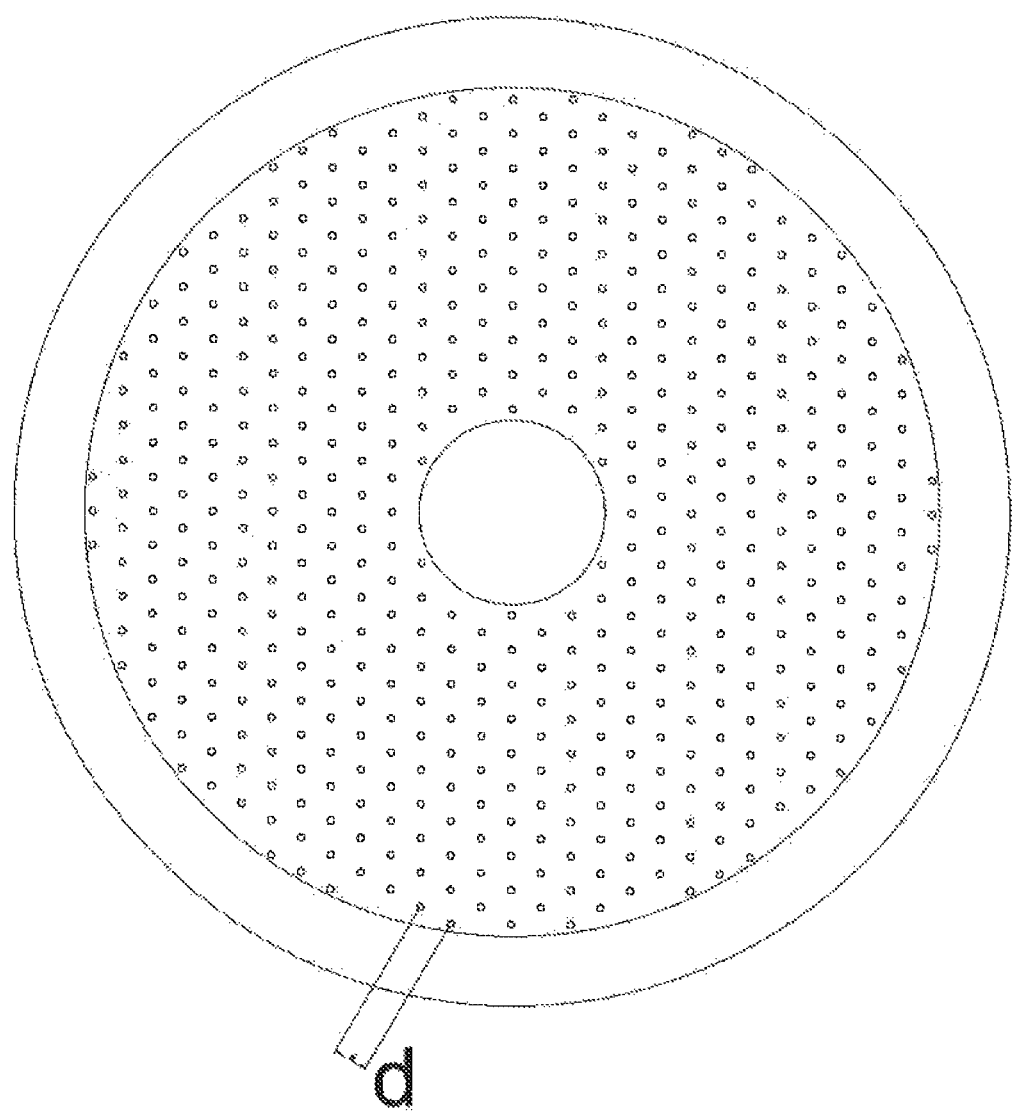
FIG. 6 is a top view of the disk furrow opener of the present invention.

FIG. 6 shows a disk furrow opener comprising a plurality dimples uniformly distributed on their surfaces.

Experimental Results

A most preferred embodiment of the present invention is based on the main characteristics of the thorax epidermis of *Diloboderus abderus* beetle.

A laboring test is performed employing an agricultural tool comprising conical or hemispherical dimples, having a radius r and a depth h, spaced apart a distance d following a hexagonal and homogeneous pattern over the entire tool surface The morphological unit pattern is defined as an equilateral triangle with dimples at each corner, as can be seen in FIG. 1. The morphological unit planar density (PD) is defined as the quotient between the sum of all partial dimple areas within the triangle ($A_C$) and the total triangle area ($A_T$).

$$A_T = d^2 \cdot (3)^{1/2}/4$$

$$A_C = 3 \cdot 1/6 \cdot \pi \cdot r^2$$

$$A_C = \pi \cdot r^2/2$$

$$PD = A_C/A_T$$

A correction factor (CF) has to he applied to the planar density in order to take into account for the incomplete or partial dimples located on the tool edges. Said CF is obtained from the following equation:

$$CF = (N + \Sigma n_i)/N$$

where N is the number of actual dimples and $n_i$ is the dimple fraction on the tool edges.

Therefore, the corrected planar density ($PD_C$) is:

$$PD_C = A_C/(A_T \cdot (CF)^2)$$

The laboring test allows determining the most suitable morphological unit the PD of which shows a difference in traction force demand, i.e. a smaller power consumption.

The field tests were conducted on argiudoll soil located at the Centro Nacional de Investigaciones Agropecuarias (INTA-Castelar, Argentina) in order to compare the traction force demand between a known ordinary smooth shovel and several preferred embodiments of the invention, with modified surface topography, being all shovels of identical size.

The test results are given in the following Table I:

TABLE I

Surface characteristics of the shovels used in the tests.

| Designation | Element Morphology | Diameter (mm) | Pattern | $PD_c$ |
|---|---|---|---|---|
| Bio1 | Conical/hemispherical Dimple | 2 | Hexagonal Homogeneous | 0.0299 |

TABLE I-continued

Surface characteristics of the shovels used in the tests.

| Designation | Element Morphology | Diameter (mm) | Pattern | $PD_c$ |
|---|---|---|---|---|
| Bio2 | Hemispherical Protrusion | 2 | Hexagonal Homogeneous | 0.0299 |
| Bio3 | Conical/hemispherical Dimple | 2 | Hexagonal Heterogeneous | 0.0945/0.0299 |
| Bio4 | Conical/hemispherical Dimple | 2 | Hexagonal Homogeneous | 0.0161 |
| Bio5 | Conical/hemispherical Dimple | 2 | Hexagonal Homogeneous | 0.0945 |

Measurement of the force required to pull the shovels as shown in FIG. 4 was performed using a triaxial force capture instrument designed and developed at the Laboratorio de Terramecánica e Implantación de Cultivos (IIR-INTA Castelar-Argentina) as part of the project INTA PE AEAI 1703 "Improvements in main crop implantation". This device allows to measure soil reactions on the tested tool in axial, vertical and transversal directions in relation to the motion direction, as well as the instantaneous motion speed and working depth.

The experiment area was divided in four acceptably homogeneous sites. In turn, within said sites and in order to minimize errors caused by variations in soil conditions, a number of parcels were delimited in which furrows produced by the different shovel designs were randomly paired.

Thus, each parcel represented a complete set because all of treatments were included in each test. The test procedure was to make each of the tested tools work along soil parcels in paths of about 100 meters long at an effective speed of 1.5 m·s$^{-1}$. The furrow generated on the ground is the experimental unit. The demand of force required along those paths was registered by the electronic load cells of the instrument and stored at one-second intervals in electronic data records.

The procedure was repeated between nine and sixteen times, according to the number of assessed treatments in each of the tests. Treatments and environmental conditions at the time of performing the tests and the obtained results are shown in Tables II to Table XIII.

Data statistical processing was carried out by Analysis of Variance (ANOVA) for an Experimental Randomized Complete Block Design (RCBD)).

In those tests that comprised more than two treatments, these were contrasted by means of Dunnett's test. The null hypothesis ($H_0$) referring to the indifference in the effect of a shovel surface modification regarding a smooth shovel (control), was rejected when the significance level was less than 5% (0.05).

Additionally, orthogonal contrasts were made when necessary to compare different biomimetic shovel designs or two or more treatments regarding the control.

TABLE II

Treatments, used sites, gravimetric soil moisture and its coefficient of variation. Test 1.

| | | Gravimetric moisture | | | | | |
|---|---|---|---|---|---|---|---|
| | | (%) Depth (mm) | | | CV (%) Depth (mm) | | |
| Treatment | Sites | 0-100 | 101-200 | Average | 0-100 | 101-200 | Total |
| Smooth Bio 1 | I | 26.4 | 24.1 | 25.2 | 13.3 | 9.6 | 11.5 |
| | II | 28.0 | 24.4 | 26.2 | 11.2 | 13.6 | 12.4 |
| | IV | 23.2 | 21.6 | 22.4 | 7.9 | 8.4 | 8.2 |

TABLE III

Treatments, used sites, gravimetric soil moisture and its coefficient of variation. Test 2.

| | | Gravimetric moisture | | | | | | | |
|---|---|---|---|---|---|---|---|---|---|
| | | (%) Depth (mm) | | | | CV (%) Depth (mm) | | | |
| Treatment | Sites | 0-50 | 51-100 | 101-150 | Average | 0-50 | 51-100 | 101-150 | Total |
| Smooth Bio 1 Bio 2 | I | 30.7 | 28.8 | 28.3 | 29.2 | 5.6 | 6.9 | 6.2 | 6.23 |
| | II | 28.6 | 29.2 | 28.5 | 28.8 | 9.5 | 5.3 | 2.6 | 5.78 |
| | III | 31.2 | 29.6 | 29.0 | 30.0 | 5.7 | 4.6 | 4.1 | 4.83 |
| | IV | 27.5 | 27.1 | 26.4 | 27.0 | 3.9 | 5.3 | 2.7 | 3.99 |

TABLE IV

Soil bulk density and coefficient of variation of the sites used in Test 2.

| | Bulk density | | | | | | | |
|---|---|---|---|---|---|---|---|---|
| | g cm$^{-3}$ Depth (mm) | | | | CV (%) Depth (mm) | | | |
| Sites | 0-50 | 51-100 | 101-150 | Average | 0-50 | 51-100 | 101-150 | Total |
| I | 1.18 | 1.24 | 1.28 | 1.23 | 5.1 | 5.7 | 4.1 | 4.98 |
| II | 1.14 | 1.25 | 1.30 | 1.23 | 5.3 | 3.1 | 1.4 | 3.28 |
| III | 1.13 | 1.22 | 1.27 | 1.21 | 6.8 | 3.6 | 2.3 | 4.21 |
| IV | 1.24 | 1.28 | 1.32 | 1.28 | 6.5 | 5.4 | 4.9 | 5.58 |

TABLE V

Soil penetration resistance and coefficient of variation of the sites used in Test 2.

| | Penetration resistance (IC) | | | | | | | | | |
|---|---|---|---|---|---|---|---|---|---|---|
| | kPa | | | | | CV (%) | | | | |
| | Depth (mm) | | | | | Depth (mm) | | | | |
| Sites | 0-50 | 51-100 | 101-150 | 151-200 | Average | 0-50 | 51-100 | 101-150 | 151-200 | Total |
| I | 686 | 1178 | 2143 | 2488 | 1624 | 60.4 | 49.7 | 32.6 | 20.8 | 40.9 |
| II | 553 | 918 | 1978 | 2207 | 1414 | 66.4 | 50.9 | 37.5 | 31.2 | 46.5 |
| III | 501 | 1152 | 1609 | 2182 | 1361 | 62.7 | 29.0 | 35.2 | 25.2 | 38.1 |
| IV | 678 | 1449 | 1946 | 2232 | 1577 | 75.6 | 35.4 | 25.8 | 27.9 | 41.2 |

TABLE VI

Treatments, used sites, gravimetric soil moisture and its coefficient of variation. Test 3.

| | | | | Gravimetric moisture | | | | | |
|---|---|---|---|---|---|---|---|---|---|
| | | | | (%) | | | CV (%) | | |
| | | | | Depth (mm) | | | Depth (mm) | | |
| Treatment | | | Site | 0-100 | 101-200 | Average | 0-100 | 101-200 | Total |
| Smooth | Bio 1 | Bio 3 | I | 23.7 | 25.7 | 24.7 | 11.2 | 8.2 | 9.7 |
| | | | II | 20.1 | 25.0 | 22.5 | 9.6 | 18.1 | 13.8 |
| | | | III | 25.2 | 27.7 | 26.5 | 7.1 | 14.8 | 11.0 |
| | | | IV | 19.7 | 22.5 | 21.1 | 7.5 | 16.9 | 12.2 |

TABLE VII

Treatments, used sites, gravimetric soil moisture and its coefficient of variation. Test 4.

| | | | | | Gravimetric moisture | | | | | | |
|---|---|---|---|---|---|---|---|---|---|---|---|
| | | | | | (%) | | | | CV (%) | | |
| | | | | | Depth (mm) | | | | Depth (mm) | | |
| Treatment | | | | Site | 0-50 | 51-100 | 101-150 | Average | 0-50 | 51-100 | 101-150 | Total |
| Smooth | Bio 1 | Bio 4 | Bio 5 | I | 33.1 | 30.0 | 29.9 | 31.0 | 6.0 | 7.9 | 2.9 | 5.6 |
| | | | | II | 25.3 | 27.9 | 30.2 | 27.8 | 2.7 | 9.4 | 14.6 | 8.9 |
| | | | | III | 32.5 | 34.6 | 29.9 | 32.3 | 0.3 | 2.1 | 15.9 | 6.1 |
| | | | | IV | 24.9 | 27.4 | 25.0 | 25.8 | 2.2 | 7.3 | 12.8 | 7.4 |

TABLE VIII

Soil bulk density and coefficient of variation of the sites used in Test 4.

| | Bulk density | | | | | | | |
|---|---|---|---|---|---|---|---|---|
| | g cm$^{-3}$ | | | | CV (%) | | | |
| | Depth (mm) | | | | Depth (mm) | | | |
| Site | 0-50 | 51-100 | 101-150 | Average | 0-50 | 51-100 | 101-150 | Total |
| I | 1.11 | 1.23 | 1.22 | 1.19 | 3.8 | 4.7 | 1.6 | 3.4 |
| II | 1.27 | 1.39 | 1.39 | 1.35 | 14.1 | 8.1 | 3.4 | 8.5 |
| III | 1.04 | 1.24 | 1.34 | 1.20 | 10.5 | 1.5 | 6.1 | 6.0 |
| IV | 1.31 | 1.40 | 1.47 | 1.39 | 6.0 | 5.0 | 2.1 | 4.4 |

TABLE IX

Soil penetration resistance and coefficient of variation of the sites used in Test 4.

| | Penetration resistance (IC) | | | | | | | | |
|---|---|---|---|---|---|---|---|---|---|
| | kPa Depth (mm) | | | | | CV (%) Depth (mm) | | | |
| Site | 0-50 | 51-100 | 101-150 | 151-200 | Average | 0-50 | 51-100 | 101-150 | 151-200 | Total |
| I | 343 | 694 | 795 | 1182 | 753 | 28.9 | 33.1 | 45.5 | 45.7 | 38.3 |
| II | 516 | 737 | 710 | 1041 | 751 | 36.4 | 33.5 | 36.0 | 32.8 | 34.7 |
| III | 569 | 546 | 1201 | 1716 | 1008 | 58.1 | 51.6 | 44.0 | 39.1 | 48.2 |
| IV | 580 | 604 | 819 | 1068 | 768 | 81.2 | 71.3 | 49.7 | 46.9 | 62.3 |

Test Results

Test 1

In the first test, mainly exploratory, two shovels were used. One of them, an ordinary shovel designated as Smooth (control) was polished on their active surface. The other, designated as Bio1, after being polished it was superficially modified as indicated in Table I. Average traction demand with the smooth shovel was 109.68 kg, and when using the Bio1 a reduction of approximately 7% was obtained as in this case, the average traction demand reached 101.97 kg. Measurement standard error was of 2.25 kg (2.1%) in the case of the smooth shovel and 2.0 kg (2.0%) for Bio1 shovel, on a total of 807 data. The probability that this difference is due to chance was less than 0.01% (Pr>F <0.0001), as is shown in Table X.

TABLE X

Analysis of variance. Dependent variable: F1. Type III Error

| | Average F1 | | Mean squares | | | |
|---|---|---|---|---|---|---|
| Treatment | (kg) | N | Treatment | Error | F | Pr > F |
| Smooth | 109.68 | 366 | 9796.1 | 310.0 | 31.6 | <0.0001 |
| Bio1 | 101.97 | 441 | | | | |

Reference: F1: Axial force

Test 2

In the second test, the shovels mentioned above were tested again, also including then another different shovel design designated as Bio2. This had a morphological unit distribution similar to that of Bio1, but having protrusions instead of dimples, as indicated in Table I. The average traction force demands were 126.44 kg, 122.58 kg and 140.63 kg for the smooth shovel, Bio1 and Bio2 respectively. Measurement standard error ranged between 1.93 kg and 1.94 kg, for a total of 2281 data, Bio2 clearly differed from the other two shovels, confirming the observations made during the test where it showed a low self-cleaning ability, as indicated in Table XI.

TABLE XI

Analysis of variance y Dunnett's test.
Dependent variable: F1. Type III Error

| | Average | Dunnett | | Mean squares | | | |
|---|---|---|---|---|---|---|---|
| Treatment | F1 (kg) | Pr < t | N | Treatment | Error | F | Pr > F |
| Smooth | 126.44 | | 769 | 58602.2 | 282.6 | 34.3 | <0.0001 |
| Bio1 | 122.58 | <0.0001 | 756 | | | | |
| Bio2 | 140.63 | 1.000 | 756 | | | | |

References: F1: Axial force; Dunnett: Control: smooth shovel

Test 3

A third test was conducted for the smooth and Bio1 shovels, this time compared to a different shovel having a higher density of dimples in the front end, designated as Bio3. The average traction force demands were 145.19 kg, 141.43 kg and 148.52 kg for the smooth, Bio1 and Bio3 shovels, respectively. In the same order, the measurement standard error was 2.46 kg, 2.48 kg and 2.54 kg for a total of 1669 observations. Bio3 showed an average value higher than the smooth shovel, but without statistical significance. The most important difference in traction force demand, about 5%, occurred between Bio3 and Bio1 shovels, which reached a statistical significance threshold, as can be appreciated in table XII.

TABLE XII

Analysis of variance y Dunnett's test.
Dependent variable: F1. Type III Error

| | Average | Dunnett | | Mean squares | | | |
|---|---|---|---|---|---|---|---|
| Treatment | F1 (kg) | Pr < t | N | Treatment | Error | F | Pr > F |
| Smooth | 145.19 | | 572 | 8718.2 | 345.7 | 25.2 | <0.0001 |
| Bio3 | 148.52 | 1.0000 | 562 | | | | |
| Bio1 | 141.43 | 0.0009 | 535 | | | | |

References: F1: Axial force; Dunnett: Control: smooth shovel

From these results apparently there would be a limit or optimum value in the density of dimples or cavities for obtaining a favorable surface topography, and confirm the unexpected advantages of the morphological characteristics of the agricultural tool of the present invention.

Test 4

The fourth test included two new different shovels. One with less densely arranged dimples than that of Bio1, designated as Bio4 and one with higher density, designated as Bio5, both with identical and uniform distribution pattern. The best results in traction force demand were obtained with Bio1 and Bio4 shovels with demands of approx. 96.2 kg while the smooth and Bio5 shovels required traction forces of 100.2 kg and 98.2 kg, respectively. These results are listed in Table XIII as follows.

TABLE XIII

Analysis of variance y Dunnett's test.
Dependent variable: F1. Type III Error

| | Average | Dunnett | | Mean squares | | | |
|---|---|---|---|---|---|---|---|
| Treatment | F1 (kg) | Pr < t | N | Treatment | Error | F | Pr > F |
| Smooth | 100.19 | | 581 | 1895.3 | 309.2 | 6.13 | 0.0004 |
| Bio4 | 96.16 | 0.0002 | 558 | | | | |

TABLE XIII-continued

Analysis of variance y Dunnett's test.
Dependent variable: F1. Type III Error

| Treatment | Average F1 (kg) | Dunnett Pr < t | N | Mean squares Treatment | Error | F | Pr > F |
|---|---|---|---|---|---|---|---|
| Bio5 | 98.04 | 0.0507 | 592 | | | | |
| Bio1 | 96.24 | 0.0002 | 586 | | | | |

References: F1: Axial force; Dunnett: Control: smooth shovel

From the test results above it can be clearly appreciated that the modification of the topography of the active organ in an agricultural tool affects the energy efficiency with which work is performed.

The intensity of said effect is a function of the geometric characteristics of morphological units and their density and distribution.

Unexpectedly, the best results were obtained with conical or hemispherical dimples arranged in a parallelogram (hexagonal) pattern the morphological unit of which is an equilateral triangle, wherein the $PD_C$ is in the following range: $0.0161 < PD_C < 0.0945$.

This result indicates that the radius of the dimples and the distance between them are related as follows $$0.067 < r/d < 0.161$$

The invention claimed is:

1. An agricultural tool comprising a modified surface topography for reducing adherence of soil, the modified surface topography comprising a plurality of conical or hemispherical dimples on a surface of the agricultural tool arranged in a parallelogram, pattern, formed by a plurality of morphological units, each morphological unit being an equilateral triangle with one dimple at each corner, wherein the plurality of dimples have:

a corrected planar density ($PD_C$) in the range of 0.0161-0.0945, wherein $PD_C$ is defined as follows:

$$PD_C = A_C/(A_T(CF)^2)$$

where $A_C$ is a sum of all partial dimple areas within the equilateral triangle, $A_T$ is a total triangle area and CF is a correction factor obtained as follows:

$$CF = (N + \Sigma n_i)/N$$

where N is a number of actual dimples and $n_i$ is a dimple fraction on a tool edge, and a relationship r/d in a range of 0.067-0.161, where r is a dimple radius and d is a distance between dimples.

2. The agricultural tool of claim 1 wherein the $PD_C$ is 0.0299.

3. The agricultural tool of claim 1, wherein the $PD_C$ is 0.05.

4. The agricultural tool of claim 1, wherein the plurality of morphological units are arranged in rows that are spaced apart at specific angles from each other.

5. The agricultural tool of claim 1, wherein the plurality of morphological units are arranged in groups that form rows that are parallel or are spaced apart at specific angles from each other.

6. The agricultural tool of claim 5, wherein said angles are in the range of 5°-15°.

7. The agricultural tool of claim 6, wherein said rows have a radial distribution.

8. The agricultural tool of claim 1, wherein the agricultural tool is a blade, coulter, a shovel, a tiller, a furrow opener or seed furrow closer, a scarifier, a chisel or a subsoiler.

* * * * *

UNITED STATES PATENT AND TRADEMARK OFFICE
CERTIFICATE OF CORRECTION

PATENT NO. : 9,137,937 B2  Page 1 of 1
APPLICATION NO. : 14/055489
DATED : September 22, 2015
INVENTOR(S) : Canzian et al.

It is certified that error appears in the above-identified patent and that said Letters Patent is hereby corrected as shown below:

Title Page, item (73)

The name of the Assignee should be changed from "INSTITUTO NACIONAL DE TECNOLOGÍA ACROPECUARIA" to --INSTITUTO NACIONAL DE TECNOLOGÍA ACROPECUARIA and UNIVERSIDAD TECNOLÓGICA NACIONAL--

Signed and Sealed this
Fifteenth Day of March, 2016

Michelle K. Lee
*Director of the United States Patent and Trademark Office*